C. KRAMER.
Sausage Stuffer.

No. 27,722.

Patented April 3, 1860.

Witnesses:
James J. Johnston
George P. Steck

Inventor:
Christian Kramer

UNITED STATES PATENT OFFICE.

CHRISTIAN KRAMER, OF ALLEGHENY, PENNSYLVANIA.

SAUSAGE-STUFFER.

Specification of Letters Patent No. 27,722, dated April 3, 1860.

*To all whom it may concern:*

Be it known that I, CHRISTIAN KRAMER, of the city and county of Allegheny and State of Pensylvania, have invented a new and useful Improvement in Sausage-Stuffers; and I do hereby declare that the following is a full and exact description thereof, reference being had to the accompanying drawings and to the letters of reference marked thereon.

The nature of my invention consists in the use of two wheels working in combination with a screw, said wheels and screw being arranged and combined in the manner hereinafter described.

To enable others skilled in the art to make and use my invention I will proceed to describe its construction and operation.

Figure 3:
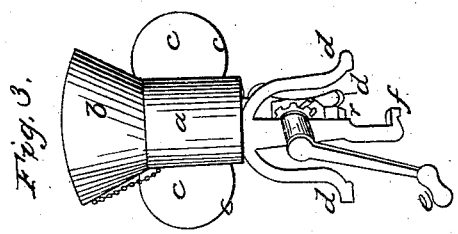
Figure 2:
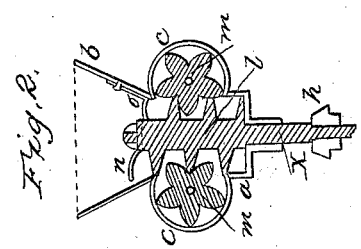
Figure 1:
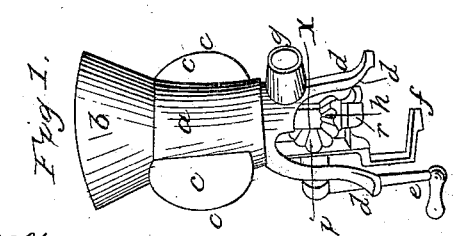

In the accompanying drawings, Figure 1 is a photographic view, representing the back of the sausage stuffer. Fig. 2 is a photographic view, representing the front of the sausage stuffer. Fig. 3 is a cut or sectional view, representing the hopper, screw, and the two wheels which work in combination with the screw.

(*a*) is the case which surrounds the screw (*l*). To the case (*a*) is attached two small cases marked (*c*). In the cases (*c*) are placed the wheels (*m*).

(*n*) is a gathering sweep which is placed on the upper end of the screw (*l*).

(*b*) is the hopper. To the side of hopper (*b*) is attached a feeding piece (*a*).

(*x*) is the axis of the screw (*l*). On the lower end of the axis (*x*) is a beveled wheel (*h*), which gears into the bevel wheel (*i*) on the axis of the crank (*e*).

(*d*) are the feet.

(*f*) is a piece used in connection with a thumb screw for the purpose of securing it to a table or stand.

(*r*) is a nut used for holding the screw down to its place.

(*g*) is the nozzle to which the horn or tube commonly used in stuffing sausages is attached.

The operation of my improvement is as follows: The chopped meat is thrown into the hopper (*b*). Now by turning the crank (*e*) the screw (*l*) is put in motion, which will put in motion the gatherer (*n*) and wheels (*m*). The gatherer (*n*) carries the chopped meat around to the feed piece (*o*), which forces it into the space between the threads of the screw (*l*), and the wheels (*m*) force it down the incline of the threads of the screw and out at the nozzle.

Having thus described the nature, construction, and operation of my improvement, what I claim as of my invention, and desire to secure by Letters-Patent of the United States, is—

The arrangement of the gatherer (*n*), and feed piece (*o*), in the hopper (*b*), wheels (*m*), and vertical screw (*l*), arranged, constructed, and operated as herein described and for the purpose set forth.

CHRISTIAN KRAMER.

Witnesses:
JAMES J. JOHNSTON,
GEORGE P. STECK.